United States Patent [19]

Burger et al.

[11] 3,837,036

[45] Sept. 24, 1974

[54] APPARATUS FOR WIPING EXPOSED CONVEX SURFACES OF LENSES ON HEAD LIGHTS OF AUTOMOTIVE VEHICLES OR THE LIKE

[75] Inventors: Karl-Heinz Burger; Manfred Hoffmann-Clewe; Willi Schaper, all of Buhl, Germany

[73] Assignee: Robert Bosch GmbH, Stuttgart, Germany

[22] Filed: Apr. 27, 1972

[21] Appl. No.: 248,125

[30] Foreign Application Priority Data
May 3, 1971 Germany.......................... 2121730

[52] U.S. Cl........... 15/250.23, 15/250.16, 15/250.35
[51] Int. Cl........................... B60s 1/32, B60s 1/38
[58] Field of Search....... 15/250.30, 250.35, 250.01, 15/250.23, 250.13, 250.16, 250.19, 250.34, 250.22

[56] References Cited
UNITED STATES PATENTS

| | | | |
|---|---|---|---|
| 3,082,462 | 3/1963 | Barenyi............................ | 15/250.30 |
| 3,402,418 | 9/1968 | Roy.................................. | 15/250.01 |
| 3,599,269 | 8/1971 | Congdon...................... | 15/250.30 X |
| 3,718,941 | 3/1973 | Deutscher et al................ | 15/250.23 |

*Primary Examiner*—Peter Feldman
*Attorney, Agent, or Firm*—Michael S. Striker

[57] ABSTRACT

Apparatus for wiping the exposed convex surface on the lens of a head light in an automobile has a lever which is oscillatable about an axis passing through the center of curvature of the convex surface. The lever is pivoted to an arm which is connected to the central portion of an elongated deformable wiper blade. When the lever is oscillated by a motor, the arm moves in parallelism with itself and moves the blade sideways so that the latter sweeps the major part of the convex surface. The end portions of the blade bear against stops provided on the head light when the blade leaves a central position and approaches either of its two end positions whereby the arm flexes the blade and maintains an elastic lip of the blade in full contact with the convex surface. The axis of the lever is coplanar with the blade when the latter assumes its central position. A torsion spring reacts against the lever and biases the arm in a direction to urge the median portion of the blade against the convex surface.

8 Claims, 6 Drawing Figures

PATENTED SEP 24 1974 3,837,036

APPARATUS FOR WIPING EXPOSED CONVEX SURFACES OF LENSES ON HEAD LIGHTS OF AUTOMOTIVE VEHICLES OR THE LIKE

BACKGROUND OF THE INVENTION

The present invention relates to apparatus for wiping convex surfaces, and more particularly to improvements in apparatus which can be utilized to wipe exposed convex surfaces on the lenses of head lights in automotive vehicles or the like.

It is already known to provide an automotive vehicle with apparatus for wiping the exposed surfaces on the lenses of head lights. In accordance with a presently known proposal, the wiping apparatus comprises an elongated blade which is mounted on a carriage and a mechanism for reciprocating the carriage so as to maintain the wiper blade in contact with the convex surface of the lens. The carriage travels along a rail whose curvature follows that of the exposed surface on the lens. The means for moving the carriage comprises a reversible motor which is connected with the carriage by a chain. A drawback of such proposal is that the carriage is likely to jam, especially if dirt or other foreign matter is allowed to deposit on the guide rail.

It was further proposed to mount the wiper blade for the exposed convex surface of the lens in a head ight on an arm which is pivotable about a fixed axis. Such proposal has met with little success because the blade can sweep only a relatively small segment-shaped portion of the exposed surface.

SUMMARY OF THE INVENTION

An object of the invention is to provide a novel and improved apparatus which can sweep at least the major part of an exposed convex surface and which is constructed and assembled in such a way that its movable parts are less likely to become jammed than in heretofore known wiping apparatus.

Another object of the invention is to provide a wiping apparatus for convex surfaces wherein the blade can follow the outline of a surface having a relatively small radius of curvature, such as the exposed convex surface of the lens in the head light of an automotive vehicle.

A further object of the invention is to provide an apparatus which is simpler than heretofore known apparatus, which occupies little room in an automotive vehicle, which can be used to wipe the exposed surface or surfaces of one or more lights at the front or rear end of an automotive vehicle, and whose power requirements are sufficiently low to warrant its use in expensive as well as in popularly priced automotive vehicles.

The invention is embodied in an apparatus for wiping convex surfaces having predetermined radii of curvature, particularly for wiping exposd spherical surfaces of lenses on head lights or other lights of automotive vehicles. The apparatus comprises a deformable elongated wiper blade, an arm connected with the blade and arranged to maintain one or more lips of the blade in contact with the surface to be wiped, carrier means oscillatable about a predetermined axis and connected with the arm to move the arm and the blade sideways back and forth so that the blade travels along the surface to be wiped, and drive means for oscillating the carrier means. The axis about which the carrier means oscillates is substantially parallel to the longitudinal extension of the wiper blade and is preferably coplanar with the blade when the latter dwells in a central position in which it extends along a diameter of the surface to be wiped. The distance between the axis of the carrier means and the blade at least approximates the radius of curvature of the surface to be wiped.

The blade is deformable in directions of its sidewise movement, and the path along which the end portions of the blade move in response to oscillation of the carrier means is preferably flanked by two pairs of stops. The end portions of the blade engage one pair of the stops when the blade leaves its median position and travels toward one of its end positions whereby the arm deforms the blade and maintains it in full contact with the surface to be wiped. The end portions of the blade engage the other pair of stops when the blade is being moved toward the other end position whereby the arm again deforms the blade and insures that the blade remains in full contact with the surface to be wiped. A torsion spring or analogous biasing means is preferably provided to bias the arm in a direction to urge the central portion of the blade against the exposed convex surface.

DESCRIPTION OF THE PREFERRED EMBODIMENTS

Figure 1:
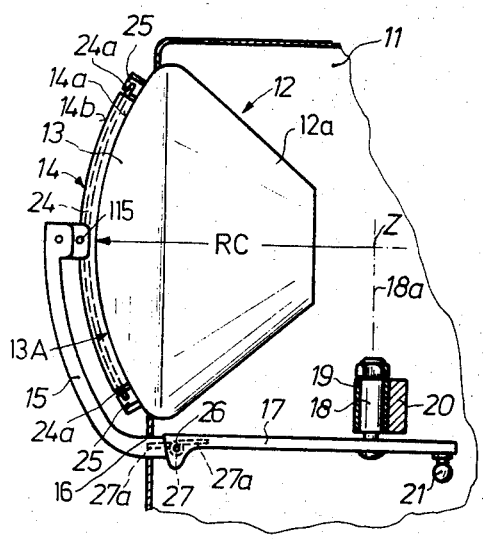
FIG. 1 is a fragmentary longitudinal vertical sectional view of a head light and of the adjoining portion of the chassis in an automotive vehicle, further showing a wiping apparatus for the exposed convex surface of the lens of the head light.

Referring first to FIG. 1, there is shown the chassis or frame 11 of an automotive vehicle. The frame 11 accomodates a head light 12 which includes a housing 12a and a lens 13 having a convex external surface 13A which is a portion of a sphere. The center of curvature Z of the exposed surface 13A is located behind the housing 12a in the interior of the frame 11. The exposed surface 13A has a circular outline and the radius of the circle of such outline is shown at R in FIG. 4. The radius of curvature RC of the exposed surface 13A is shown in FIG. 1; it will be noted that the radius R is smaller than the radius RC.

Figure 5:
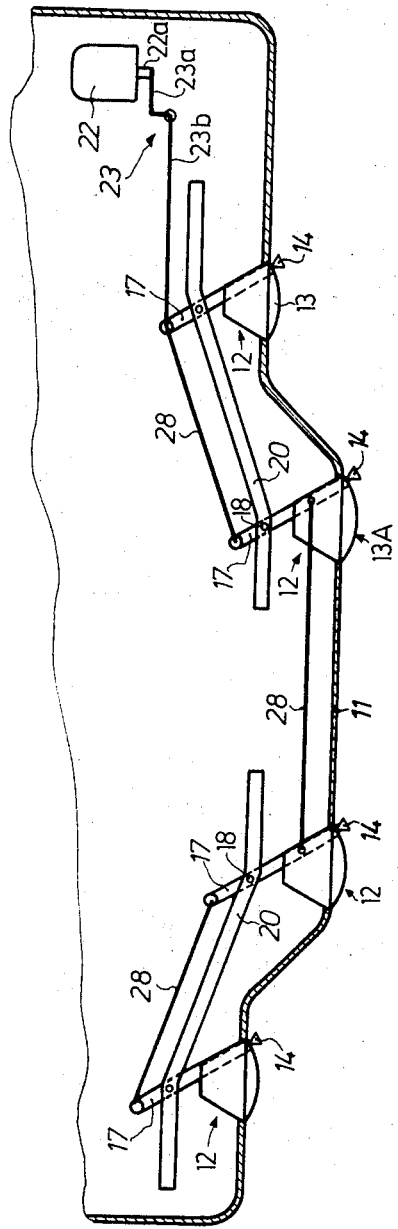
FIG. 5 is a fragmentary horizontal sectional view of the front part of an automotive vehicle with four head lights, further showing certain component parts of a wiping apparatus for the lenses of all four head lights and common drive means for the moving parts of the wiping apparatus.

The improved wiping apparatus for the exposed surface 13A of the lens 13 comprises an elongated wiper blade 14 having a central or median portion which is articulately connected to an end portion of a wiper arm 15, as at 115. The arm 15 is of arcuate shape and extends in front of the exposed surface 13A and in front of the wiper blade 14. The lower portion of the arm 15 extends with some clearance through an opening 16 in the front wall of the frame 11 and is articulately connected to one arm of a two-armed lever or carrier 17 which is installed in the interior of the frame 11. The articulate connection between the lever 17 and the wiper arm 15 comprises a horizontal pivot member 26 whose axis is normal to and intersects in space the vertical axis 18a about which the carrier or lever 17 is pivotable or oscillatable in response to starting of a motor 22 which is shown in FIG. 5 and forms part of the drive means for the lever 17. A median portion of the lever 17 is connected to a pivot pin 18 which is turnable in a sleeve 19 secured to a support 20 which is mounted in the interior of the frame 11. The aforementioned vertical axis 18a is the axis of the pivot pin 18 and this axis passes through the center of curvature Z of the exposed surface 13A of the lens 13. The other arm of the lever 17 extends inwardly beyond the pivot pin 18 and is provided with a spherical coupling element 21 which receives motion from the motor 22 in a manner as shown in FIG. 5. Thus, the rotary output element 22a of the motor 22 is connected with a crank arm 23a which is articulately connected with a link 23b. The parts 23a, 23b form part of a linkage 23 and the left-hand end of the link 23b is connected with the spherical coupling element 21 of the lever 17. The axis 18a of the pivot pin 18 is substantially parallel with the longitudinal extension of the wiper blade 14, and the axis 18a is coplanar with the blade 14 when the latter dwells in a central position somewhat to the right of the position shown in FIG. 2.

Figure 6:
FIG. 6 is an enlarged cross-sectional view of a wiper blade.

Referring to FIG. 6, it will be seen that the wiper blade 14 comprises a rubber-like portion 114 and a metallic portion or spring 24 which is embedded in the rubber-like portion 114.

The portion 114 comprises a lip 14a which abuts against the exposed surface 13A of the ens 13 and a ridge or back 14b which surrounds the major part of the spring 24. The end portions 24a (see FIGS. 1-4) of the spring 24 extend beyond the ridge 14b and are movable between two pairs of abutments or stops 25 which are provided on the head light 12 and preferably form integral parts of the lens 13. The articulate connection 115 between the wiper blade 14 and the arcuate wiper arm 15 is located at least substantially midway between the end portions 24a of the spring 24 (see particularly FIG. 1). A means for biasing the upper portion of the wiper arm 15 toward the exposed surface 13A of the lens 13 is provided in the region of the pivot member 26. Such biasing means comprise a torsion spring 27 one eg 27a of which is anchored in the lever 17 and the other leg 27a of which is anchored in the lower portion of the arm 15. The purpose of the torsion spring 27 is to permanently urge the median portion of the wiper blade 14 against the adjacent portion of the surface 13A.

Referring again to FIG. 5, it will be seen that the drive means including the motor 22 can oscillate two or more levers or carriers 17. FIG. 5 shows that the front portion of the automobile frame 11 accommodates four head lights 12 and a wiping apparatus having a discrete wiper blade 14 for the exposed surface 13A of each of the four lenses 13, a discrete wiper arm 15 (not shown in FIG. 5) for each wiper blade 14, and a discrete lever 17 for each wiper arm 15. The support 20 includes two portions each of which carries the pivot pins 18 for two levers 17. The drive means for the three left-hand levers 17 includes connecting rods 28 which couple the levers 17 to each other so that all four levers are oscillated in synchronism and to the same extent when the motor 22 is started to oscillate the right-hand lever 17 through the intermediary of its output element 22a and linkage 23. It is clear that the wiping apparatus of the present invention can be used with equal advantage to oscillate one or more wiper blades 14 at the rear end of an automotive vehicle.

Figure 2:
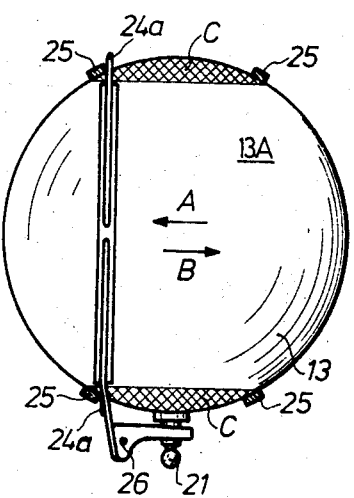
FIG. 2 is a front elevational view of the head light, with the blade of the wiping apparatus shown in an intermediate position.
Figure 3:
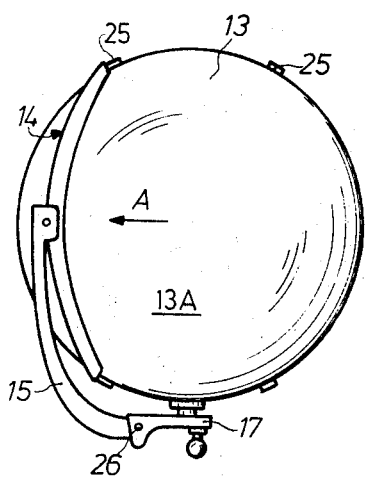
FIG. 3 is a similar front elevational view but showing the blade of the wiping apparatus close to one of its end positions.
Figure 4:
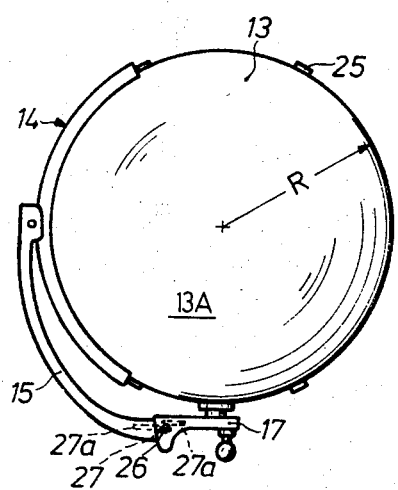
FIG. 4 is a similar front elevational view but showing the blade of the wiping apparatus in the one end position.

The operation of the improved wiping apparatus is as follows:

Referring to FIGS. 1-4, and assuming that the motor 22 is started to oscillate the lever or carrier 17 through the intermediary of the output element 22a and linkage 23, the lever 17 causes the wiper arm 15 to move sideways (in parallelism with itself) and to move the wiper blade 14 sideways between two spaced end positions one of which is shown in FIG. 4. The directions in which the lip 14a of the rubber-like portion 114 of the wiper blade 14 moves along and sweeps the exposed surface 13A of the lens 13 are indicated by the arrows A and B. The length of the lip 14a is somewhat less than the diameter (R) of the outline of the exposed surface 13A. Therefore, the lip 14a will sweep the entire surface 13A save for two small unswept portions C which are shown in FIG. 2. The combined area of the unswept portions C of the exposed surface 13A is so small that the failure of the lip 14a to sweep such portions does not affect the quality of the wiping or cleaning action of the improved apparatus. The two unswept portions C extend between the two upper and the two lower abutments or stops 25 on the lens 13.

When the lever 17 causes the arm 15 to move the blade 14 from its neutral or central position midway between the two left-hand and the two right-hand stops 25 toward the position shown in FIG. 2, i.e., while the arm 15 moves the blade 14 in the direction indicated by the arrow A, the end portions 24a engage the two left-hand stops 25 on the lens 13. This prevents the end portions of the blade 14 from moving further toward the left-hand end of the surface 13A. However, the lever 17 continues to move the arm 15 sideways in a direction to the left, as viewed in FIG. 2, whereby the articulate connection 115 between the arm 15 and the wiper blade 14 causes a deformation of the blade so that the latter is flexed in the direction indicated by the arrow A and moves toward, through and beyond the position shown in FIG. 3 to ultimately reach the left-hand end position shown in FIG. 4. The end position of the wiper blade 14 shown in FIG. 4 can be the position of rest of such blade; in such end position, the blade 14 cannot obstruct the light beams which are produced by the head light 12 and pass forwardly through the lens 13. The motor 22 thereupon causes the parts 22a and 23 to reverse the direction of oscillatory movement of the lever 17 so that the wiper blade 14 is caused to leave the end position of FIG. 4 and begins to move in the direction indicated by the arrow B shown in FIG. 2. The blade 14 then moves to the intermediate positions of FIGS. 3 and 2, to its neutral position in which the end portions 24a of the spring 24 are located substantially midway between the left-hand and right-hand pairs of stops 25, and moves toward its right-hand end position whereby the end portions 24a of the spring 24 reach and engage the two right-hand stops 25. As the arm 15 continues to move sideways in the direction indicated by the arrow B, the median portion of the blade 14 is flexed until the blade reaches its right-hand end position in which it substantially follows the outline of the exposed surface 13A. The spring 24 tends to straighten the blade 14 when the blade dwells in either of its two end positions so that the end portions 24a of the spring 24 continue to abut against the left-hand or right-hand stops 25 until the blade 14 reaches the position shown in FIG. 2 or a second position which is a mirror image of the position shown in FIG. 2 and in which the end portions 24a abut against the two right-hand stops 25.

When the end portions 24a of the spring 24 abut against one pair of the stops 25 and the arm 15 continues to move the median portion of this blade 14 toward the respective end position, the curvature of the lip 14a increases gradually so that the lip remains in permanent sweeping engagement with the exposed surface 13a. Such flexing of the lip 14a is particularly pronounced in the regions adjacent to the end portions 24a of the spring 24. Some tilting of the lip 14a can take place close to the upper and lower ends of the blade 14.

An advantage of the improved wiping apparatus is that is can employ a highly reliable oscillatory means for moving the wiper blade 14 back and forth and that the blade can sweep substantially the entire exposed convex surface 13A. This is in contrast to the heretofore known constructions wherein the wiper arm is pivotable or oscillatable about a fixed axis rather than being movable sideways as in the apparatus of the present invention. The arm 15 insures that the entire lip 14a remains in sweeping contact with the exposed surface 13A while the blade 14 moves between its two end positions. It is clear that the improved apparatus can find equal use for sweeping of exposed convex surfaces which need not constitute portions of a sphere.

An advantage of the torsion spring 27 or analogous biasing means for the arm 17 is that such biasing means insures permanent engagement between the entire lip 14a and the exosed surface 13A even if the center of curvature Z of the surface 13A is not located on the axis 18a of the lever or carrier 17.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. Wiping apparatus for use with windows having a curved periphery, particularly lenses on motor-vehicle lamps, comprising an elongated elastically deformable wiper blade having spaced ends and a lip adapted to contact a surface of a window to be wiped; a mounting arm engaging said wiper blade intermediate said ends and holding it in position adjacent said surface; a drive shaft connected with said mounting arm for moving the same and said wiper blade in alternately reversed directions over said surface; and abutments provided in the region of said periphery and positioned for engagement with the respective ends of said wiper blade as the latter approaches said periphery, so as to cause elastic deformation of said wiper blade into substantial conformance with the curvature of the periphery.

2. Wiping apparatus as defined in claim 1, said abutments comprising two pairs of abutments, each pair being adapted to cooperate with one of said ends.

3. Wiping apparatus as defined in claim 1, said abutments comprising at least two abutments for each of said ends and spaced from one another in the direction of movement of said wiper blade.

4. Wiping apparatus as defined in claim 1, said mounting arm having a configuration corresponding at least substantially to the contour of said periphery in the contact region of said wiper blade.

5. Wiping apparatus as defined in claim 1; and further comprising biasing means for biasing said wiper blade in direction towards said surface.

6. Apparatus as defined in claim 1, wherein each of said stop means constitutes part of the body whose exposed surface is being wiped by said blade.

7. Apparatus as defined in claim 1, further comprising at least one second deformable elongated wiper blade located in front of a second convex surface to be wiped, a second arm connected to said second blade and arranged to maintain the latter in contact with the respective surface, second carrier means oscillatable about a second predetermined axis and connected with said second arm to move said second arm and said second blade sideways back and forth along the respective surface, and connecting means for connecting said first mentioned and second carrier means so that said second carrier means oscillates in response to oscillatory movement of and in synchronism with said first mentioned carrier means.

8. Apparatus as defined in claim 1, wherein said drive means comprises a motor having a rotary output element, a crank arm secured to said output element, and link means articulately connected with said carrier means and said crank arm.

* * * * *